United States Patent [19]
Ishijima et al.

[11] Patent Number: 6,061,020
[45] Date of Patent: May 9, 2000

[54] METHOD AND APPARATUS FOR TRANSMITTING RADIO WAVE BY ROTATING PLANE OF POLARIZATION

[75] Inventors: Iwao Ishijima, Mitaka; Yasubumi Kanai, Tokyo; Michio Ishikawa, Yokohama; Akira Tsutsumi, Urawa; Shigeki Sugiyama, Sakura; Toshio Miyoshi, Chofu, all of Japan

[73] Assignee: The University of Electro-Communications, Tokyo, Japan

[21] Appl. No.: 08/995,044

[22] Filed: Oct. 31, 1997

[30] Foreign Application Priority Data

Oct. 31, 1996 [JP] Japan .................................. 8-290103

[51] Int. Cl.[7] .......................... H01Q 21/06; H04B 1/10; H04B 7/01
[52] U.S. Cl. ......................... 342/361; 342/162; 455/501; 455/504; 455/63
[58] Field of Search ..................................... 342/161, 162, 342/163, 164, 165, 361; 359/156; 455/616, 501, 504, 63

[56] References Cited

FOREIGN PATENT DOCUMENTS 96390006  6/1996  European Pat. Off. .

Primary Examiner—Gregory C. Issing
Attorney, Agent, or Firm—Stevens, Davis, Miller & Mosher, L.L.P

[57] ABSTRACT

At a transmitting end, first and second dipole antennas are crossed each other by right angles and are arranged in a plane perpendicular to a propagating direction of radio wave. In first and second balanced modulators, a carrier signal is modulated with respective modulation signals having a phase difference of 90° to produce balanced-modulated signals, which are then supplied to the first and second dipole antennas, respectively. Then a plane of polarization of a composite vector of radio waves transmitted by the dipole antennas is rotated at a frequency of the modulation signals, said frequency being higher than a fading frequency. The modulation signals are controlled by a state of a digital signal to be transmitted. At a receiving end, the digital signal is reproduced by receiving the transmitted radio wave by a conventional single side band receiver.

4 Claims, 7 Drawing Sheets

JS2SD でんきつうしんだいがく1
周波数 13.560MHz 送信出力 100W 電気通信大学実験無線局

Experimental Station
The University of Electro-Co

第1条 この法律は、電波の公平且つ能率的な利用を確保することによって、公共の福祉を増進することを目的とする。
第2条 この法律及びこの法律に基づく命令の規定の解釈に関しては、次の規定に従うものとする。

For the p[
extra com[
"night" mea
the establis
one day at t
the establis
the followi
such office,
any such
hours of a S
For the purp

METHOD AND APPARATUS FOR TRANSMITTING RADIO WAVE BY ROTATING PLANE OF POLARIZATION

BACKGROUND OF THE INVENTION

1. Field of the Invention

The present invention relates to a method of transmitting and receiving a radio wave by rotating a plane of polarization of the radio wave.

2. Related Art Statement

The present invention is applicable to various fields such as electrical communication engineering, electronics engineering, radio wave propagation, radio communication equipment engineering, antenna engineering and information engineering. More specifically, the present invention may be applied to the following fields:

(1) data transmission between different stairs in a tall building (mutual connection of computers, E-mail and LAN), (2) data transmission over handy type transmitter and receiver between a fold in a ship and a land office;

(3) data communication between transshipments (container crane and office of loading and unloading company) on land and officer's cabin in a ship;

(4) guides for various kinds of robots by radio waves (collection of data from industrial robot, dam and weather monitoring equipment);

(5) transmission of command for unmanned flying object and artificial satellite;

(6) telemetry from monitoring satellite and information transmission media;

(7) digital communication for high speed moving objects;

(8) digital telecommunication (including broadcasting).

Heretofore, the radio communication has been carried out by using the amplitude modulation, frequency modulation, phase modulation and combinations thereof. However, radio communications using the known modulation system is subjected to the influence of fading and noise. Because such influence could not be removed completely, it has been considered that the fading is caused by the change in the transmission medium which could not be controlled at all.

SUMMARY OF THE INVENTION

The present invention has for its object to provide a novel and useful method of transmitting a signal by means of a novel modulation system which is not affected by fading and noise.

it is another object of the invention to provide a novel and useful apparatus for transmitting an electric signal by modulating a radio wave in accordance with the electric signal to be transmitted, in which influence of fading and noise can be removed or at least mitigated.

According to the invention, a method of transmitting a digital signal from a transmitter and receiving the digital signal at a receiver, wherein at a transmitter end, radio wave of a carrier signal is transmitted from two dipole antennas which are mutually crossed at right angles and are arranged in a plane perpendicular to a propagating direction of the radio wave under such a condition that a plane of polarization of the radio wave is rotated in accordance with the digital signal to be transmitted, and at a receiver end, the radio wave transmitted from said pair of dipole antennas is received by an antenna and the rotation of the plane of polarization of the received radio wave is detected to reproduce the digital signal.

In an embodiment of the transmission method according to the invention, at the transmitter end, the plane of polarization of a radio wave is rotated when the digital signal, in the form of a bivalent signal, is in one state, i.e. a first state, ("1" or "0"), and the plane of polarization of a radio wave is not rotated when the digital signal is in the other state, i.e. a second state, opposite to the first state, ("0" or "1").

In another embodiment of the transmission method according to the invention, when the digital signal in the form of a bivalent signal is in one state, the plane of polarization of transmitted radio wave is rotated at a first modulation frequency, and when the digital signal is in the other state, the plane of polarization of radio wave is rotated at a second modulation frequency which is different from said first modulation frequency. In this case, both the first and second modulation frequencies should be higher than a frequency at which the plane of polarization of radio wave might be rotated during the propagation from the transmitter to the receiver.

According to the invention, a transmission apparatus for transmitting a digital signal from a transmitter to a receiver, wherein said transmitter comprises first and second dipole antennas being crossed each other by right angles and arranged in a plane perpendicular to a propagating direction of radio wave, and means for modulating a rotation of a plane of polarization of radio wave transmitted from said dipole antennas in accordance with a digital signal to be transmitted at one or more frequencies which are higher than a fading frequency, and said receiver comprises an antenna for receiving the radio wave transmitted by said dipole antennas of the transmitter, and means for detecting the rotation of the plane of polarization of the received radio wave to reproduce the digital signal.

According to the invention, said receiver may be formed by a conventional single side band receiver. In a preferable embodiment of the transmission apparatus according to the invention, said receiver includes a plurality of filters for selectively detecting components of said frequencies, and means for judging a co-occurrence of outputs of said filters to confirm an existence of the transmission of the digital signal.

According to the invention, a transmitter for transmitting a digital signal comprises:

a first oscillator for generating a carrier signal having a first frequency;

a second oscillator for generating a modulating signal having a second frequency which is lower than said first frequency of the carrier signal;

a control circuit for receiving a digital signal in the form of a bivalent signal to be transmitted and generating a control signal having first and second values corresponding to two states of the digital signal;

a first balanced modulator for modulating said carrier signal with a modulating signal generated from said second oscillator to produce a first balanced-modulated signal when said control signal has the first value;

a 90° phase shifter for shifting a phase of said modulating signal by 90° to produce a phase shifted modulating signal;

a second balanced modulator for modulating said carrier signal with said phase shifted modulating signal produced from said phase shifter to generate a second balanced-modulated signal shows phase is shifted by 90° with respect to said first balanced-modulated signal; and first and second dipole antennas for transmitting said first and second modulated signals, respectively as radio waves a plane of polarization of composed radio waves is rotated when said control signal has the first value and is not rotated when the control signal has the second value, said first and second dipole antennas being crossed each other by right angles and being arranged in a plane perpendicular to a propagating direction of the radio wave.

According to the invention, a transmitter for transmitting a digital signal comprises:

a first oscillator for generating a carrier signal;

a control circuit for receiving a digital signal in the form of a bivalent signal to be transmitted and generating a control signal having first and second values corresponding to two states of the digital signal;

a second oscillator for receiving said control signal and generating first and second modulating signals having first and second modulation frequencies when said control signal have the first and second values, respectively, said first and second modulation frequencies being lower than a frequency of said carrier signal;

a first balanced modulator for modulating said carrier signal with the first or second modulating signal generated from said second oscillator to produce a first balanced-modulated signal;

a 90° phase shifter for shifting a phase of said first or second modulating signal by 90° to produce a phase shifted modulating signal;

a second balanced modulator for modulating said carrier signal with said phase shifted modulating signal produced from said phase shifter to generate a second balanced-modulated signal whose phase is shifted by 90° with respect to said first balanced-modulated signal; and first and second dipole antennas being crossed each other by right angles and being arranged in a plane perpendicular to a propagating direction of the radio wave, and transmitting said first and second balanced-modulated signals, respectively as radio waves such that a plane of polarization of composed radio waves is rotated at the first modulation frequency when said control signal has the first value and is rotated at the second modulation frequency when said control signal has the second value.

According to the invention, the radio wave transmitted from the dipole antennas can be received by a conventional single side band receiver having a conventional dipole antenna or whip antenna. In the single side band receiver, by processing the received signal in a usual manner, the rotation of the plane of polarization of the radio wave can be detected and thus the original digital signal can be reproduced.

As stated above, the transmission method according to the invention could not be classified into the known modulation systems such as the amplitude modulation, frequency modulation, phase modulation and nay combination thereof, but may be classified into a new modulation system called a polarization plane modulation system. In this new modulation system, it is possible to remove or at least mitigate the influence of undesired fading and noise as will be discussed later.

Heretofore, the fading and noise introduced in the radio wave during its propagation have been considered as phenomenon in which a strength of an electric field at the reception point is decayed. However, the inventors of the present application have revealed after various experiments and analyses a fact that the fading is mainly caused by undesired rotation of a plane of polarization of radio wave at a reception point. Therefore, by modulating the plane of polarization of radio wave in accordance with the digital signal at a frequency which is sufficient higher than a frequency of the fading, the influence of the fading can be completely removed.

BRIEF DESCRIPTION OF THE DRAWINGS

FIG. 6 shows a received facsimile image transmitted by the known FS modulation system; and FIG. 7 shows a received facsimile image transmitted by the transmission method according to the invention.

DESCRIPTION OF THE PREFERRED EMBODIMENTS

Figure 1:
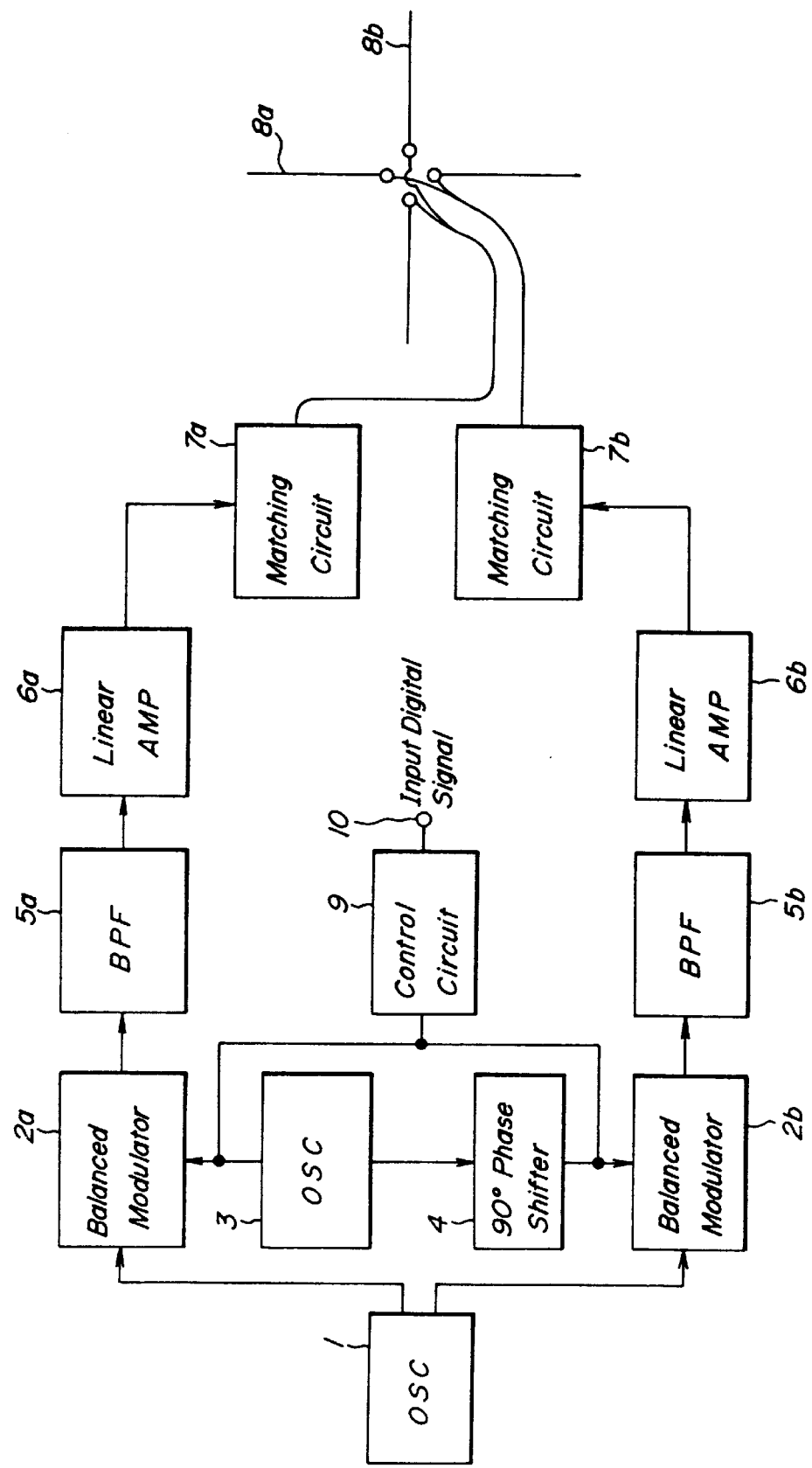
FIG. 1 is a block diagram showing an embodiment of the transmitter according to the invention.

FIG. 1 is a block diagram showing an embodiment of the transmitter according to the invention. In FIG. 1, a reference numeral 1 denotes a first oscillator generating a carrier signal having a frequency. The oscillator 1 may be formed by a crystal oscillation circuit or synthesizer. In case of using the crystal oscillation circuit, a signal generated by a crystal oscillator has to be multiplied by means of a frequency multiplier to a desired frequency.

The transmitter further comprises first and second balanced modulators 2a and 2b, second oscillator 3 and 90° phase shifter 4. The second oscillator 3 generates a modulation signal having a second frequency which is lower than the first frequency of the carrier signal. The modulation signal generated by the second oscillator 3 is supplied directly to the first balanced modulator 2a and to the second modulator 2b via the 90° phase shifter 4 as first and second modulation signals, respectively. The 90° phase shifter 4 may be formed by an analog circuit or a digital logic circuit.

In the first and second balanced modulators 2a and 2b, the carrier signal generated by the first oscillator 1 is modulated with the first and second modulation signals, respectively whose phases are shifted by 90°, and therefore envelopes of first and second modulated signals supplied from the first and second balanced modulators 2a and 2b, respectively have a mutual phase difference of 90°. It should be noted that the first and second modulated signals from the first and second balanced modulators 2a and 2b, respectively are double side band signals with a suppressed carrier.

The first and second modulated signals generated from the first and second balanced modulators 2a and 2b are supplied to band pass filters 5a and 5b, respectively to removed undesired frequency components to derive first and second single side band signals. These first and second single side band modulated signals are then supplied to first and second linear amplifiers 6a and 6b, respectively and are amplified to a desired power level for transmission. Then, the amplified first and second single side band signals are supplied to first and second dipole antennas 8a and 8b, respectively by means of first and second matching circuits 7a and 7b, respectively. The linear amplifiers 6a and 6b, matching circuits 7a and 7b, and dipole antennas 8a and 8b are coupled by means of high frequency coaxial cables.

The first and second dipole antennas 8a and 8b are crossed with each other at right angles and are arranged in a plane which is perpendicular to a propagating direction of radio waves transmitted by the dipole antennas.

The transmitter further includes a control circuit 9 which controls the transmitted radio waves in accordance with an input signal to be transmitted. The input signal in the form of a digital signal is supplied to an input terminal 10. When the input signal is in "0" state or first state, the control circuit 9 produces a control signal of 0 volt, but when the digital input signal is in "1" state or second state opposite the first state, the control circuit 9 generates the control signal of a predetermined DC voltage. In this manner, the control signal produced by the control circuit 9 has first and second voltage levels.

Figure 2:
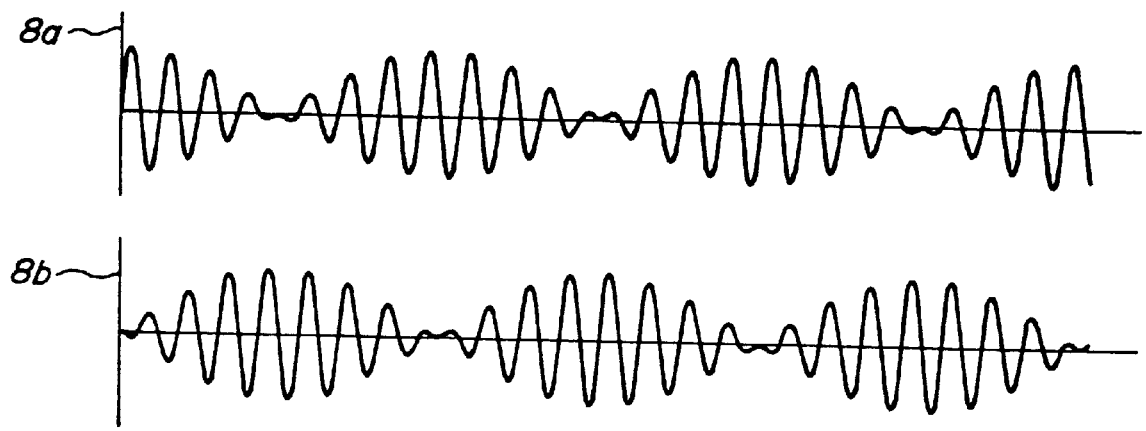
FIG. 2 is a diagram illustrating waveforms of modulated signals to be transmitted from dipole antennas shown in FIG. 1.
Figure 3:
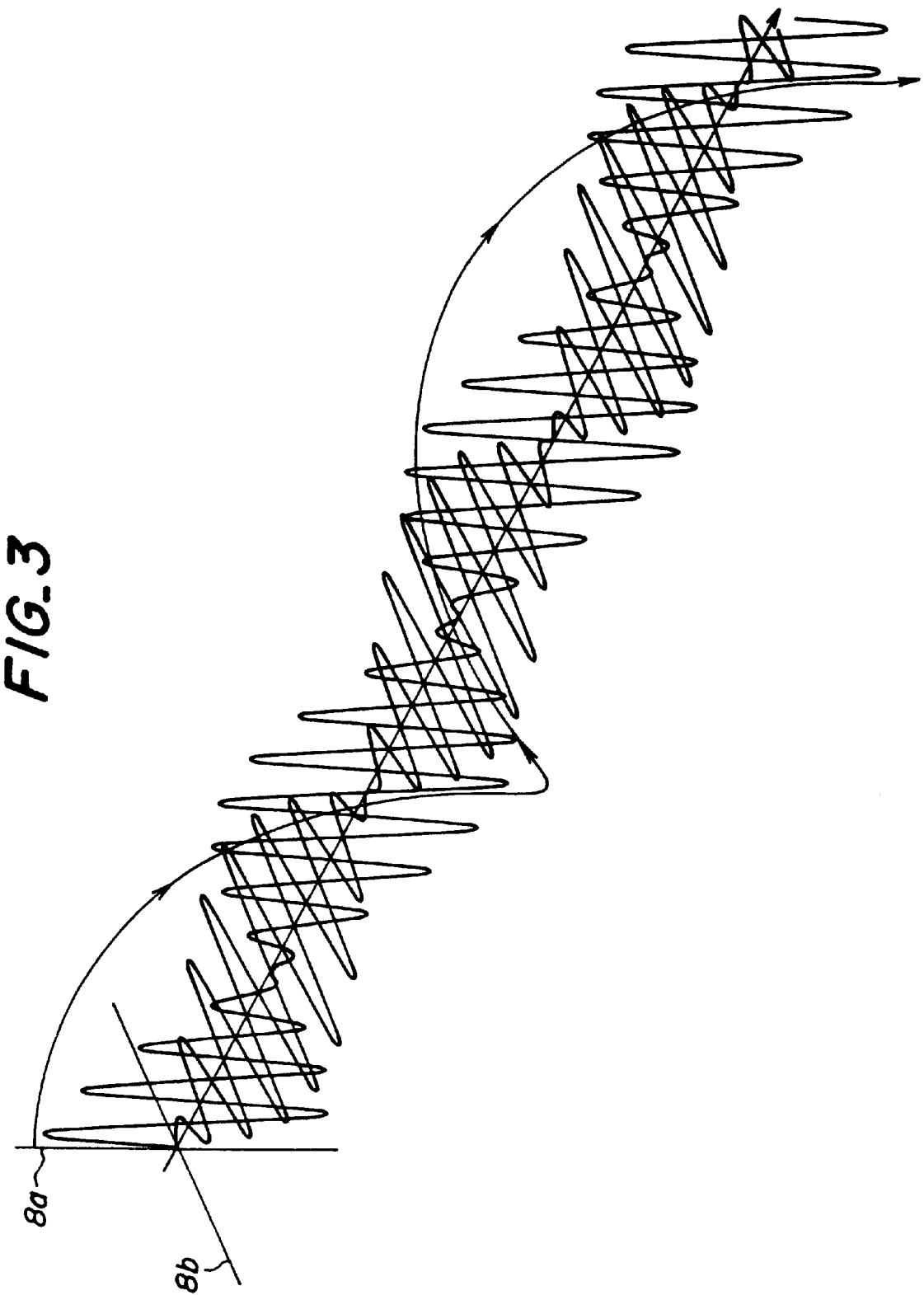
FIG. 3 is a diagram depicting radio waves transmitted from the dipole antennas.

When the control signal from the control circuit 9 is 0 volt, the modulation signal generated by the second oscillator 3 are supplied to the first and second balanced modulators 2a and 2b with the phase difference of 90°. Then, the first and second balanced modulated waves supplied to the first and second dipole antennas 8a and 8b, respectively have envelopes shown in FIG. 2. Then, a plane of polarization of a composite vector of these radio waves transmitted from the first and second dipole antennas 8a and 8b is rotated at a frequency which is identical with the second frequency of the modulating signal generated by the second oscillator 3 as illustrated in FIG. 3.

When the given DC voltage appears at the output of the control circuit 9 in response to the "1" state of the input digital signal, the modulating signal is not supplied to the first and second balanced modulators 2a and 2b, and therefore the balanced modulators lose the modulation faculty and generate the carrier signal from the first oscillator 1 as it is. Then, the first and second dipole antennas 8a and 8b transmit carrier waves having the same phase. Then, the composite vector of these radio waves becomes a linearly polarized wave and thus the rotation of the plane of polarization does not occur.

The input signal supplied to the input terminal 10 of the control circuit 9 may be a facsimile image signal or character code signals. In case of the facsimile transmission using the high frequency band (HF), the second frequency of the modulating signal generated from the second oscillator 3 is preferably set to 800 Hz in order to match the standard of WMO (World Meteorological Organization), and in case of the direct printing radio teletypewriter (RTTY) using a narrow band in HF, the second frequency should be set to 170 Hz for matching the current standards of ITUR (International Telecommunication Union Research). However, according to the invention, the second frequency at which the plane of polarization of the transmitted radio wave may be determined at will by considering a bit rate of transmitted signal and allowable frequency band width.

According to the invention, the transmitted radio wave may be received by using any conventional antenna and single side band (SSB) receiver. When the radio wave having the rotated plane of polarization is received by a usual dipole antenna, a current flowing through the dipole antenna has a waveform which is similar to that of a balanced modulated signal with the frequency at which the plane of polarization rotates. When this high frequency balanced modulated signal is received by the conventional SSB receiver, an upper or lower side band wave is detected. Therefore, the SSB receiver produces an output signal which is similar to that obtained when a frequency shifted wave (FS) having a frequency which differs from the frequency of the linear polarization by the frequency at which the plane of polarization is detected. In the standard of WMO, a frequency shift of −400 HZ from a center frequency is denoted as "black" and the frequency shift of +400 Hz is defined to represent "white" in the facsimile transmission, and therefore it is preferable to use the lower side band. Similarly in the radio teletypewriter, a frequency shift of −85 Hz is denoted to represent "A" (or "1") and a frequency shift of +85 Hz is defined to indicate "Z" (or "0"), and thus also in this case it is preferable to use the lower side band. In this manner, the conventional terminal equipment can be utilized as it is.

In the present invention, the signal is transmitted with the rotation of the plane of polarization which is principally identical with the Faraday rotation which causes the fading. However, in the present invention, the rotation of the plane of polarization is performed at a higher frequency than that of the Faraday rotation by not less than $10^3$ times, and therefore it is possible to remove the interference fading which has been revealed to be caused by the Faraday rotation.

Figure 4:
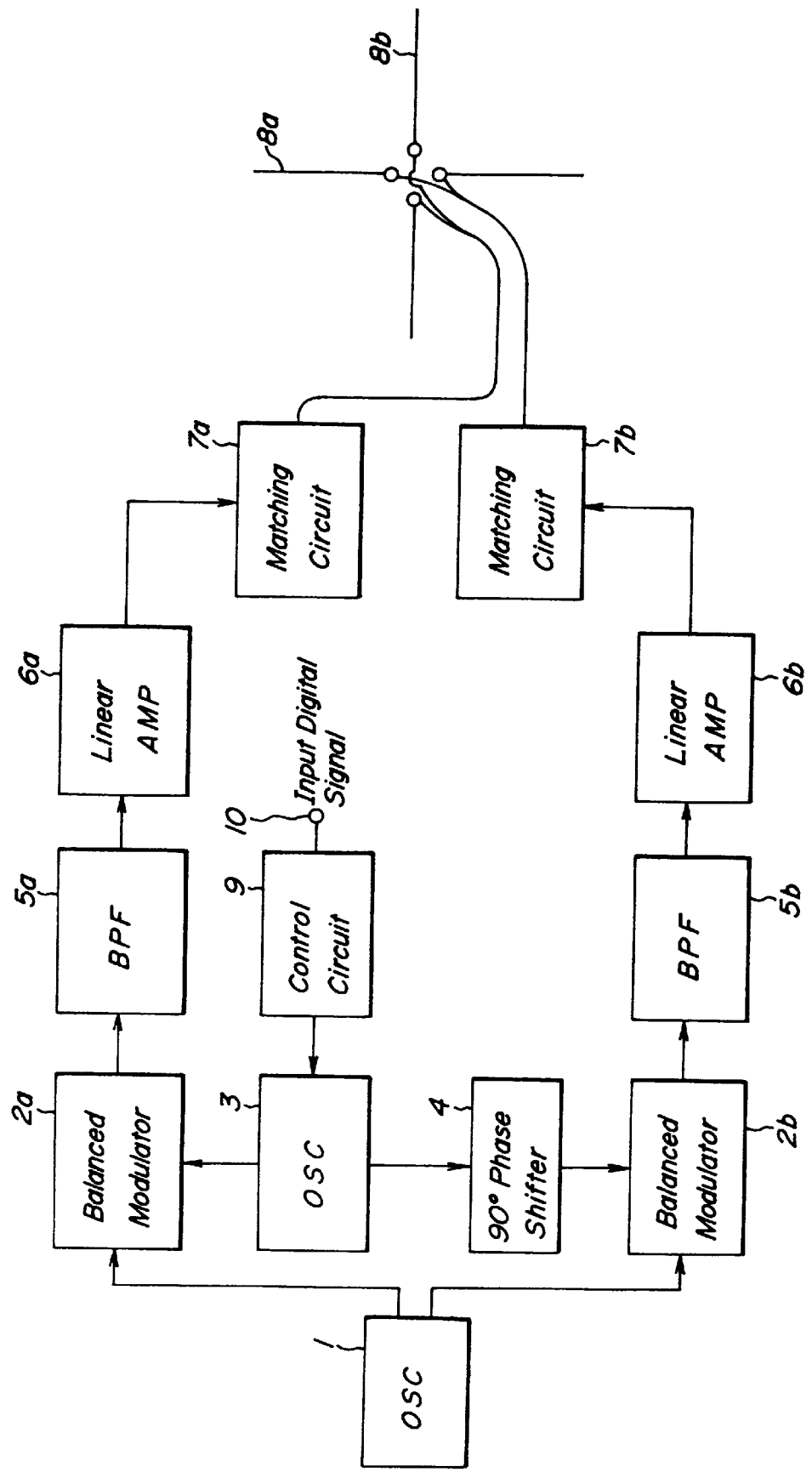
FIG. 4 is a block diagram illustrating another embodiment of the transmitter according to the invention.

FIG. 4 is a block diagram showing another embodiment of the transmitter according to the invention. In this embodiment, portions similar to those shown in FIG. 1 are denoted by the same reference numerals used in FIG. 1. In the first embodiment depicted in FIG. 1, when the input signal is in a "1" state and the control signal has the second value of 0 volt, the radio wave transmitted by the dipole antennas 8a and 8b becomes the linearly polarized wave. Therefore, during this signal period, the plane of polarization of the radio wave is subjected to the Faraday rotation and is interfered radio waves due to the multiplath to produce fading to some extent. In the present embodiment, in order to remove such a demerit, during the signal state of "1", the plane of polarization is rotated at a frequency which is not subjected to the Faraday rotation. That is to say, the input signal is transmitted by modulating the rotation frequency in accordance with the level of the input signal. Then, the radio wave transmitted by the dipole antennas can be free from the Faraday rotation and interference due to the multipath, and therefore the fading can be removed much more effectively than the first embodiment.

In the present embodiment, the second oscillator 3 is constructed such that is oscillation frequency is changed in accordance with the level of the control signal generated by the control circuit 9. For instance, in case of transmitting the facsimile image signal, when the input signal has 0 volt level, the second oscillator 3 produces the modulating signal having a frequency of 100 Hz, and when the input signal has 5 volt, the second oscillator generates the modulating signal having a frequency of 800 Hz. According to the standard of WMO, the black and white signals should have a frequency difference to 800 Hz. As long as this standard is satisfied, the frequencies of the modulating signal may be determined at will by considering a band width allowed by the radio row. The modulating signal generated by the second oscillator 3 is supplied to the first balanced modulator 2a directly and is supplied to the second balanced modulator 2b by means of the 90° phase shifter 4. Therefore, the dipole antennas 8a and 8b transmits radio wave whose plane of polarization is rotated at 100 Hz or 900 Hz in accordance with the level of the input digital signal. In case of performing the narrow band direct printing teletypewriter, the first and second frequencies of the modulating signal may be determined to have a frequency difference of 170 Hz recommended by ITUR. For instance, the first and second frequencies of the modulating signal may be set to 170 Hz and 340 Hz, respectively.

Also in the present embodiment, the radio wave transmitted by the dipole antennas 8a and 8b may be received by the conventional antenna and SSB receiver. In this case, when a frequency of a local oscillator in the receiver is set to such a value that differences between the rotation frequencies of the plane of polarization and the frequency of the local oscillator are equal to values required for terminal equipment, the conventional terminal equipment such as facsimile machine and printer can be utilized as it is. For instance, in case of the facsimile, said differences become 1500 Hz (corresponding to "black") and 2300 Hz (corresponding to "white"), and in case of teletypewriter, said differences are set to 1615 Hz (corresponding to "space") and 1785 Hz (corresponding to "mark").

Figure 5:
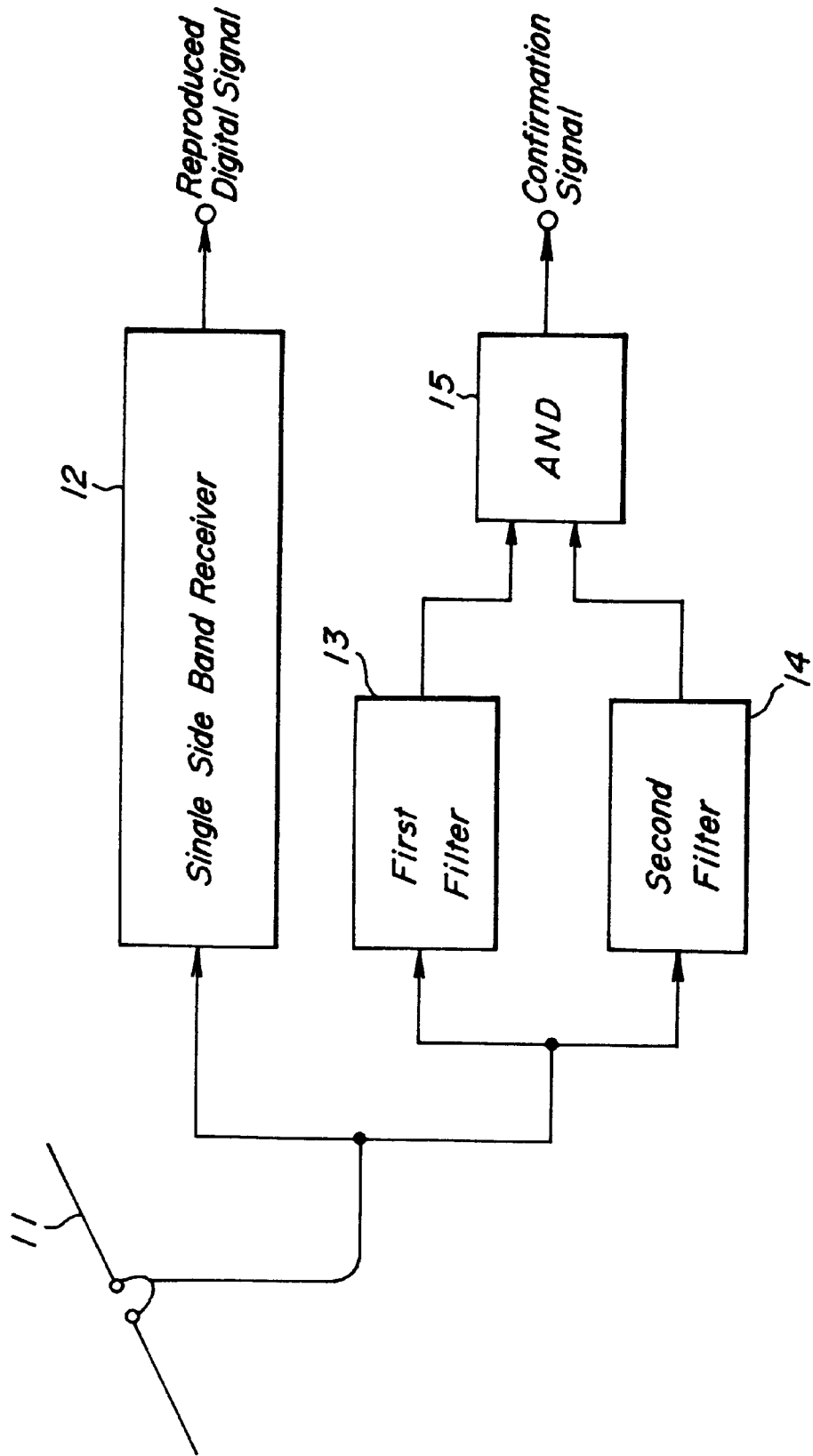
FIG. 5 is a block diagram depicting an embodiment of the receiver according to the invention.

In case of using the transmitter shown in FIG. 4, it is advantageous to add a special confirmation circuit to the conventional SSB receiver. FIG. 5 is a block diagram depicting a SSB receiver including such a confirmation circuit according to the invention. In FIG. 5, a reference numeral 11 shows a dipole antenna and 12 represents a circuit portion of the conventional SSB receiver including frequency converter, local oscillator, filter and IF amplifier. The radio wave is received by the dipole antenna 11 and is supplied to the SSB receiver circuit 12 and an output signal of the IF amplifier is supplied to filters 13 and 14 for detecting the two components consisting of the balance modulated wave. That is to say, the carrier frequency component and modulating signal component are separately detected by these filters. Then, output signals of these filters 13 and 14 are supplied to an AND circuit 15. When the radio wave is correctly received by the dipole antenna 11 without being affected by noise, the filters 13 and 14 supply the output signals and thus the AND gate 15 produces "1" output. However, if the radio wave affected by noise is received, and at least one of the filter 13 and 14 does not produce the output signal, then output of the AND gate 15 becomes "0". In this manner, the present receiver, permits confirmation of the transmission of the correct radio wave by using the output signal of the AND gate 15.

In general, when the radio wave is transmitted with the plane of polarization rotated at a high frequency, the radio wave is hardly affected by noise, and therefore the same spectrum does scarcely appear in the two output signals of the filters. Therefore, when the output of the AND gate 15 is "1", it can be judged that the signal is transmitted.

When the novel transmission system according to the invention is practically used, there is not required any special skill as compared with the known transmission systems. According to the invention, it is sufficient to arrange the two dipole antennas 8a and 8b in such a manner that they are crossed each other at right angles and are placed on a plane which is perpendicular to the propagating direction of radio wave. The transmitted radio wave may be received by the conventional SSB receiver. Further, when the confirmation circuit is added to the conventional SSB receiver as illustrated in FIG. 5, not only the influence of fading but also the influence of noise can be effectively removed.

The present invention is based on the fact that the fading is produced not by the decrease in the electric field strength at the reception site, but by the low frequency rotation of the plane of polarization of radio wave. Radio wave, particularly HF radio wave is subjected to the fading due to various factors, and the interference fading usually has a period of thirty seconds to one minute and sometimes has a period of one to two seconds. This interference fading has very undesired large influence upon the radio wave. Heretofore, the interference fading has been considered to appear by interference of plural radio waves. However, the inventors of the instant application have revealed after long study that the interference fading is caused by the following phenomenon. Since the plane of polarization of radio wave received at the antenna is rotated at a low frequency, a balanced modulation wave current having a modulation frequency which is equal to the rotation frequency of the plane of polarization is induced in the antenna, and the interference fading is caused by null points which are inherently produced in the balanced modulated wave current. According to the invention, the plane of polarization of radio wave is modulated in accordance with the input signal at a frequency which is sufficiently higher that the frequency at which the plane of polarization of radio wave is rotated to cause the interference fading. Therefore, the transmission system according to the invention is completely free from the interference fading. This has been experimentally confirmed as will be explained below.

Figure 6:
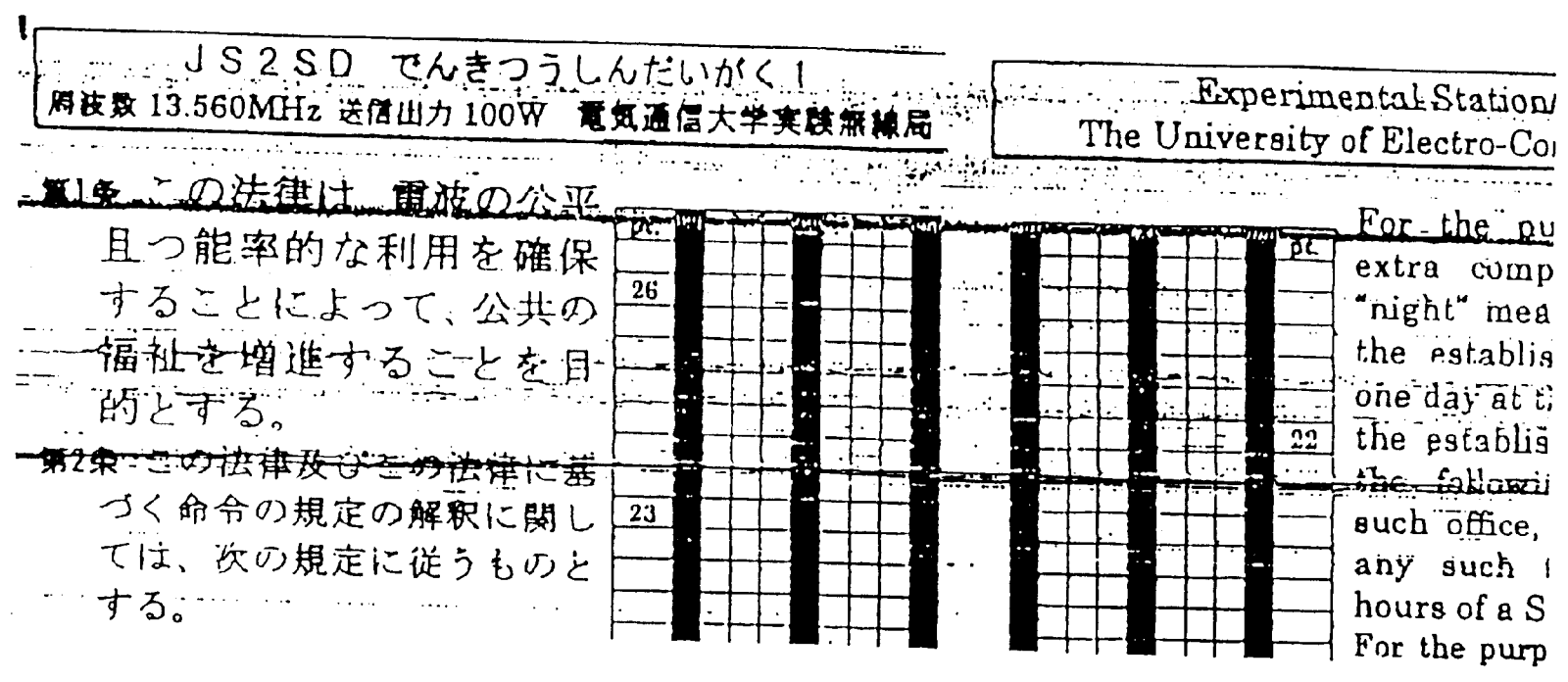

FIG. 6 is a facsimile image received by the known FS modulation system and FIG. 7 is a facsimile image of the same original received by the polarization plane modulation system according to the invention. Upon comparing these facsimile images, it is apparent that the facsimile image obtained by the present invention is free from noise and is superior to the facsimile image obtained by the known modulation system. This experiment was conducted by transmitting radio wave having a frequency of 13.560 MHz and a power of 100 W from an experimental radio station (JS2SD) in the University of Electric Communication locating at Chofu city in Tokyo and by receiving the transmitted radio wave by a radio station on "Seiun-maru" belonging to the Institute for Sea Training, Ministry of Transport sailing of the sea apart from the transmitter by about 1500 Km. This distance was determined by considering the frequency and transmission power allocated to the experimental radio station. It is also possible to perform stable transmission over a longer distance by suitably selecting transmission frequency and power. It should be noted that stable transmission over a shorter distance is also possible. Heretofore, the HF band has been considered to be not suitable for effecting the stable transmission due to large fading, but according to the invention, this HF band can be utilized effectively for performing the stable and reliable transmission.

The present invention may be applied to the transmission not only of the facsimile signal, but of all kinds of digital signals. When the present invention is applied to the teletypewriter and the multi-address communication is carried out, error rates at various receptions can be reduced simultaneously. Furthermore, in case of ARQ (Automatic Request for Repetition) mode, the number of the requests for repetition can be reduced to a large extent.

From February 1992, GMDSS (Global Maritime Distress and Safety System) has been effective. In GMDSS, the distress traffic has been changed from the classical Morse code (SOS) to the satellite EPIRB (Emergency Position Indicating Radio Beacon), EGC (Enhanced Group Calling) using the INMARSAT C (International Maritime Satellite Organization) and HF band DSC (Digital Selective Calling).

Under the new treaty, coast stations, coast earth stations, ship stations and ship earth stations all over the world were equipped with the communication systems for the above mentioned distress traffic until February 1999. However, in practice, malfunctions have occurred at an unexpectedly high frequency, which has been a worldwide problem. Malfunctions using the satellite EPIRB has been found that the frequency was determined to be identical with a usual communication frequency of aircraft. Since all the earth stations have installed the necessary equipment for the satellite EPIRB and eight COSPAS-SARSAT (Cosmicheskaya System Poiska Averynych Sudov-Search and Rescue Satellite) have been in the space, an effective and speedy solution for the above problem has been earnestly required. Calling malfunction in the HF band digital selective calling (DSC) and INMARSAT C have amounted to 97% in United States of America and 99% in Australia. This has been reported to the IMO (International Maritime Organization) by official papers. These error rates have been calculated for a sum of malfunctions for both the DSC and INMARSAT C, but it is presumed that a large number of malfunctions have occurred in the DSC alone. Any solution for this problem has not been proposed by any organizations over the whole world. The inventors of the present application have found that said serious problem is caused by designing the system based on an erroneous recognition that the fading is produced by the variation in the strength of the electric field at a reception site. The inventors have confirmed theoretically and experimentally that the fading is caused by undesired rotation of the radio wave, and thus the above problem could be solved by transmitting the signal in accordance with the rotation of the plane of polarization as explained above.

It should be noted that the present invention may be equally applied to the transmission using frequency bands other than HF band. When a higher frequency than HF is used, a size of the transmitting antennas can be reduced and therefore a space factor for the two dipole antennas crossed each other at right angles can be improved. It should be noted that, in the VHF and UHF bands, the problem of the fading does not occur, but the suppression of noise according to the present invention is still effective. According to the invention, the signal to be transmitted has to be digital signal, but since almost all analog signals may be converted into digital signals, according to the invention, it is possible to transmit any analog signal in any frequency band without being affected by fading and noise. For instance, when an analog audio signal is transmitted in the HF band according to the invention, a reproduced audio signal can have a very high quality same as the digital recording as long as a strength of the electric field at a reception site is higher than a given level.

What is claimed is:

1. A method of transmitting a digital signal from a transmitter and receiving the digital signal at a receiver, wherein at a transmitter end, a radio wave of a carrier signal is transmitted from two dipole antennas which are mutually crossed at right angles and are arranged in a plane perpendicular to a propagating direction of the radio wave under such a condition that a plane of polarization of the radio wave is rotated in accordance with the digital signal to be transmitted, and at a receiver end, the radio wave transmitted from said pair of dipole antennas is received by an antenna and the rotation of the plane of polarization of the received radio wave is detected to reproduce the digital signal; wherein the plane of polarization of the transmitted radio wave is rotated at a first modulation frequency when the digital signal in a form of a bivalent signal is in a first state; and the plane of polarization of the transmitted radio wave is rotated at a second modulation frequency which is different from said first modulation frequency when the digital signal is in a second state; and said first and second modulation frequencies being higher than fading frequency.

2. A transmission apparatus for transmitting a digital signal from a transmitter to a receiver, wherein:

said transmitter comprises first and second dipole antennas being crossed to each other at right angles and arranged in a plane perpendicular to a propagating direction of a radio wave transmitted from said dipole antennas, and means for modulating a rotation of a plane of polarization of the radio wave transmitted from said dipole antennas in accordance with a digital signal to be transmitted at one or more frequencies which are higher than a fading frequency;

said receiver comprises an antenna for receiving the radio wave transmitted by said dipole antennas of the transmitter, and means for detecting the rotation of the plane of polarization of the received radio wave to reproduce the digital signal; wherein said receiver further comprises a single side band receiver, and a confirmation circuit including a plurality of filters for selectively detecting components of said frequencies, and means for judging a co-occurrence of outputs of said filters to confirm an existence of the transmission of the digital signal.

3. A transmitter for transmitting a digital signal comprising:

a first oscillator for generating a carrier signal having a first frequency;

a second oscillator for generating a modulating signal having a second frequency which is lower than said first frequency of the carrier signal;

a control circuit for receiving a digital signal in the form of a bivalent signal to be transmitted and generating a control signal having first and second values corresponding to two states of the digital signal;

a first balanced modulator for modulating said carrier signal with a modulating signal generated from said second oscillator to produce a first balanced-modulated signal when said control signal has the first value;

a 90° phase shifter for shifting a phase of said modulating signal by 90° to produce a phase shifted modulating signal;

a second balanced modulator for modulating said carrier signal with said phase shifted modulating signal produced from said phase shifter to generate a second balanced-modulated signal whose phase is shifted by 90° with respect to said first balanced-modulated signal; and first and second dipole antennas for transmitting said first and second modulated signals, respectively as radio waves a plane of polarization of composed radio waves is rotated when said control signal has the first value and is not rotated when the control signal has the second value, said first and second dipole antennas being crossed each other by right angles and being arranged in a plane perpendicular to a propagating direction of the radio wave.

4. A transmitter for transmitting a digital signal comprising:

a first oscillator for generating a carrier signal;

a control circuit for receiving a digital signal in the form of a bivalent signal to be transmitted and generating a control signal having first and second values corresponding to two states of the digital signal;

a second oscillator for receiving said control signal and generating first and second modulating signals having first and second modulation frequencies when said control signal have the first and second values, respectively, said first and second modulation frequencies being lower than frequency of said carrier signal;

a first balanced modulator for modulating said carrier signal with the first or second modulating signal generated from said second oscillator to produce a first balanced-modulated signal;

a 90° phase shifter for shifting a phase of said first or second modulating signal by 90° to produce a phase shifted modulating signal;

a second balanced modulator for modulating said carrier signal with said phase shifted modulating signal produced from said phase shifter to generate a second balanced-modulated signal whose phase is shifted by 90° with respect to said first balanced-modulated signal; and first and second dipole antennas being crossed each other by right angles and being arranged in a plane perpendicular to a propagating direction of the radio wave, and transmitting said first and second balanced-modulated signals, respectively as radio waves such that a plane of polarization of composed radio waves is rotated at the first modulation frequency when said control signal has the first value and is rotated at the second modulation frequency when said control signal has the second value.

* * * * *